United States Patent
Tan et al.

(10) Patent No.: US 9,647,549 B2
(45) Date of Patent: May 9, 2017

(54) CURRENT SENSE CONTROLLER FOR A DC-TO-DC CONVERTER

(71) Applicant: TEXAS INSTRUMENTS INCORPORATED, Dallas, TX (US)

(72) Inventors: Runqin Tan, Shenzhen (CN); Bo Yang, Shenzhen (CN); Yuanying Deng, Shenzhen (CN); Alan Johnson, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 53 days.

(21) Appl. No.: 14/698,523

(22) Filed: Apr. 28, 2015

(65) Prior Publication Data

US 2016/0190925 A1   Jun. 30, 2016

Related U.S. Application Data

(63) Continuation of application No. PCT/CN2014/094953, filed on Dec. 25, 2014.

(51) Int. Cl.
*H02M 3/158*   (2006.01)
*H02M 1/00*    (2006.01)

(52) U.S. Cl.
CPC .... *H02M 3/158* (2013.01); *H02M 2001/0009* (2013.01)

(58) Field of Classification Search
CPC .... H02M 3/156–3/157; H02M 3/1563; H02M 3/1582; H02M 3/1588;
(Continued)

(56) References Cited

U.S. PATENT DOCUMENTS 4,994,955 A   2/1991   Schoofs et al.
7,030,570 B2  4/2006   Alexandrov
(Continued)

FOREIGN PATENT DOCUMENTS

CN    1719711 A     1/2006
CN  101405671 A     4/2011
(Continued)

OTHER PUBLICATIONS

Search Report for PCT/CN2014/094953, dated Sep. 9, 2015(11 pages).

*Primary Examiner* — Yemane Mehari
(74) *Attorney, Agent, or Firm* — William B. Kempler; Charles A. Brill; Frank D. Cimino

(57) ABSTRACT

A DC-to-DC converter comprises a first switch, a second switch coupled to the first switch, an inductor, and a plurality of serially connected power transistors. The first switch is to couple an input voltage to a common node. The first and second switches to be turned on and off in a reciprocating manner so as to couple either the input voltage or ground to the common node. The inductor, connecting the common node to an output voltage node of the DC-to-DC converter, is configured to control a voltage at the output voltage node based on current flowing through the inductor. The plurality of power transistors are concurrently controlled by a first signal that is based on a value of a voltage at the common node and a supply voltage, the serially connected power transistors to control an amount of current flowing through the inductor. Moreover, the first signal is used to prevent a high voltage drop from overstressing the plurality of power transistors while the first switch is on.

17 Claims, 2 Drawing Sheets

(58) Field of Classification Search
CPC ..... H02M 2001/007; H02M 2001/009; H02M 2001/0032; H02M 2001/0045; H02M 3/158; Y02B 70/126; Y02B 70/1466
USPC ........ 323/222, 224, 225, 271, 272, 282–290
See application file for complete search history.

(56) References Cited

U.S. PATENT DOCUMENTS

| | | | |
|---|---|---|---|
| RE42,532 E * | 7/2011 | Isham | 323/224 |
| 8,648,579 B2 | 2/2014 | Schoofs | |
| 9,071,135 B2 | 6/2015 | Chen et al. | |
| 9,195,247 B2 * | 11/2015 | Saito | G05F 1/468 |
| 2005/0057228 A1 * | 3/2005 | Shih | H02M 1/38 |
| | | | 323/222 |

FOREIGN PATENT DOCUMENTS

| | | |
|---|---|---|
| CN | 102403900 A | 4/2012 |
| CN | 103618447 A | 3/2014 |

* cited by examiner

CURRENT SENSE CONTROLLER FOR A DC-TO-DC CONVERTER

CROSS-REFERENCE TO RELATED APPLICATION

This is a continuation of copending International Application No. PCT/CN2014/094953, with an international filing date of Dec. 25, 2014, which designated the United States and is hereby fully incorporated herein by reference for all purposes.

BACKGROUND

A current sense circuit is widely used in various types of DC-to-DC converters. In general, if a potentially large output current must be driven by an on-chip switch of the DC-to-DC converter, the current sense circuit may be used to detect a relative or absolute value of this output current. A level of the output current may be monitored, or sensed, to prevent damage to the switch, or to the converter as a whole.

SUMMARY

Systems and methods to avoid overstressing a current sense controller are disclosed herein so as to assure the current sense controller to accurately sense inductor current of a DC-to-DC converter. In an embodiment, a DC-to-DC converter comprises a high side switch connected to an input voltage and a common node, a low side switch connected to ground and the common node, and a plurality of power transistors coupled to the common node. More specifically, if the high side switch is on, the high side switch provides a signal path through the high side switch and through the common node to an output voltage node of the DC-to-DC converter. If the low side switch is on, the low side switch provides a signal path through the low side switch and through the common node to the output voltage node of the DC-to-DC converter. The power transistors are configured to control a first current flowing through an inductor connecting the common node to the output voltage node based on a second current provided by a current source and a value of a conductive resistance of the plurality of power transistors, wherein the first current determines an output voltage at the output voltage node of the DC-to-DC converter. Each of the plurality of power transistors is controlled by the high side switch and the low side switch concurrently so as to prevent a high voltage drop from overstressing the plurality of the power transistors while the high side switch is on.

In another embodiment, a DC-to-DC converter comprises a first switch, a second switch coupled to the first switch, an inductor, and a plurality of serially connected power transistors. The first switch is to couple an input voltage to a common node. The first and second switches to be turned on and off in a reciprocating manner so as to couple either the input voltage or ground to the common node. The inductor, connecting the common node to an output voltage node of the DC-to-DC converter, is configured to control a voltage at the output voltage node based on current flowing through the inductor. The plurality of power transistors are concurrently controlled by a first signal that is based on a value of a voltage at the common node and a supply voltage, the serially connected power transistors to control an amount of current flowing through the inductor. Moreover, the first signal is used to prevent a high voltage drop from overstressing the plurality of power transistors while the first switch is on.

In a further embodiment, a method includes alternately switching on a high side switch and a low side switch of a DC-to-DC converter, controlling a plurality of power transistors coupled to the low side switch, based on a signal that includes a value of a constant voltage plus a value of a voltage at a common node connecting to the high side and low side switches, controlling, by the plurality of the power transistors, a voltage drop across the plurality of the power transistors, based on a value of conductance resistance of the plurality of the power transistors, and generating, based on the controlled voltage drop, a value of current flowing through an inductor connecting the common node and an output voltage node of the DC-to-DC converter.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a DC-to-DC converter, a current sense controller is widely used. Typically, if a potentially large output current, or load current, must be driven by an on-chip switch of the DC-to-DC converter, the current sense controller may be used to detect a relative or absolute value of this current. The current level may be monitored, or sensed, to prevent damage to the switch, or to the converter as a whole.

As will be explained below, embodiments of the invention are directed to a DC-to-DC converter that comprises a current sense controller for a low side switch within the converter. Including the current sense controller for the low side switch advantageously provides an accurate way to sense an output current, and further reduces the risk of damage to the current sense controller while a high side switch of the DC-to-DC converter is active (i.e., ON). The DC-to-DC converter, preferably a DC-to-DC buck converter according to the present disclosure, operates using the disclosed current sense controller as shown in a simplified circuitry form with respect to FIG. 2. Other architectures are possible as well.

Figure 1:
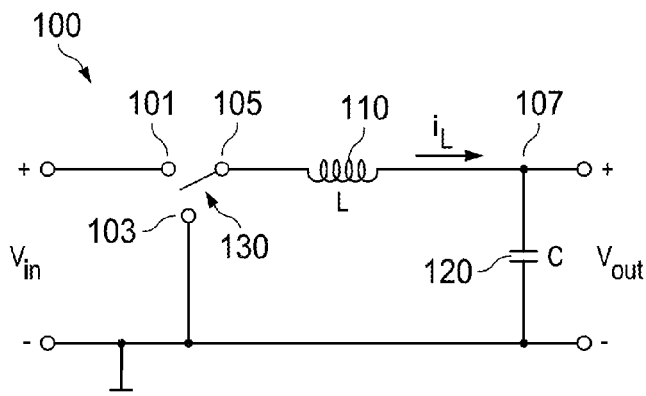
FIG. 1 shows a block diagram of a DC-to-DC buck converter in accordance with various embodiments.

FIG. 1 illustrates a DC-to-DC buck converter. FIG. 1 shows a top-level block diagram of a switched mode DC-to-DC buck converter 100. The converter 100 includes an input voltage, $V_{in}$, and an output voltage, $V_{out}$, a switch 130, an output inductor 110 and an output capacitor 120. A DC-to-DC buck converter is a voltage step-down converter, which means that an output voltage level provided by the buck converter is lower than its input voltage level.

In FIG. 1, the switch 130 is configured to selectively connect node 105 to either node 101 or 103. As such, an input voltage level received at the node 105 and in turn current, $i_L$, flowing through the inductor 110 varies in accordance with the switch 130. While the switch 130 connects the node 101 to the node 105, the converter 100 is generally referred to be at an "ON" state. On the other hand, while the node 103 is connected to the node 105, the converter 100 is at an "OFF" state.

Beginning with the converter 100 at the OFF state, the current $i_L$ is zero. When the switch 130 first switches from the node 103 to 101 (i.e., OFF to ON state), the current $i_L$ begins to change (increase), and the inductor 110 produces an opposing voltage drop across two ends of the inductor 110 in response to the changed (increased) current. The voltage drop across the inductor 110 counteracts the input voltage $V_{in}$ and thus reduces the output voltage $V_{out}$. Over time, a rate of change of current decreases, and the voltage drop across the inductor 110 decreases accordingly, which in turn increase the output voltage $V_{out}$. During the time when the current decreases, the inductor 110 continues to store energy via a magnetic field. If the converter 100 is switched to the OFF state again, there is always a voltage drop across the inductor 110. Therefore, the output voltage $V_{out}$ is always less than the input voltage $V_{in}$.

Continuing with FIG. 1, when the switch 130 switches back to node 103, the input voltage $V_{in}$ virtually disappears from node 105, and the current $i_L$ starts to decrease. The changed current produces a change of the voltage drop across the inductor 110. During this time, the inductor 110 discharges its stored energy into the rest of the converter 100. If the switch 130 switches to the node 101 again (i.e., OFF to ON state) before the inductor 110 fully discharges, the output voltage $V_{out}$ will be greater than zero.

The switch 130 is configured to repeatedly switch between the ON and OFF states to provide a regulated output voltage. Generally, the switch 130 of the converter 100 is implemented by using two switches to be alternately turned on and off so as to realize the switching behavior. More particularly, the two switches may be diodes, power metal-oxide-semiconductor field effect transistors (MOSFETs), and/or bipolar junction transistors (BJTs). While a power MOSFET is used as the switches, the switches are controlled by at least one control signal applied to a gate of the power MOSFET. For example, the control signal is a pulse width modulated (PWM) signal, wherein the PWM signal includes a duty cycle to alternately transition between a higher value and a lower value. A duty cycle is a percentage of one period in which a signal is active. A period of a periodic signal is the amount of time needed for the signal to complete one cycle.

As mentioned above, it is desirable to sense a value of an output current, or a load current, to perform various functions such as, for example, to deliberately decrease an output voltage as load current increases, and to provide for current limiting or over-current trip to protect a load and components of a voltage converter. In order to quickly identify an overstress situation at the load, the load current is sensed via a power switch (e.g., power MOSFET) through an inductor (e.g., inductor 110) of the voltage converter. More specifically, two methods may be used to measure current (e.g., $i_L$) flowing through the inductor: (1) measuring the inductor current as a voltage drop across a shunt resistor, and (2) measuring inductor current via an internal current mirror or current sense controller. The first method requires an additional external component and may be somewhat inefficient due to the shunt resistor.

The second method (using a current sense controller) may provide, via implementing advanced semiconductor devices (e.g., power MOSFETs), an accurate for sensing of the inductor current without being subject to the loss of efficiency. However, the switching behavior of the converter may potentially induce a large voltage drop across the current sense controller, which may cause damage to the current sense controller. More specifically, in some implementations of the current sense controller, while the switch 130 is ON, a high voltage drop (i.e., $V_{in}$) may be provided to the current sense controller. If the input voltage $V_{in}$ is too high, the current sense controller may become overstressed. As a result, the converter may become incapable of sensing the load current, and in turn, for example, the overstress may only be sensed until a malfunction of the converter occurs.

Embodiments of the disclosed invention provide systems and methods to accurately sense an inductor current of a voltage converter by controlling an integrated current sense controller based on a switching voltage. More specifically, the switching voltage is determined by high and low side switches of the voltage converter. As such, while the voltage converter is being switched between ON and OFF states, a high voltage drop across the current sense controller may be avoided so that the inductor current can always be sensed (monitored). Preferably, the disclosed embodiments are used in a DC-to-DC buck converter. However, the disclosed embodiments may be used in other types of voltage converters, such as AC-to-DC converters, DC-to-DC boost converters, etc.

Figure 2:
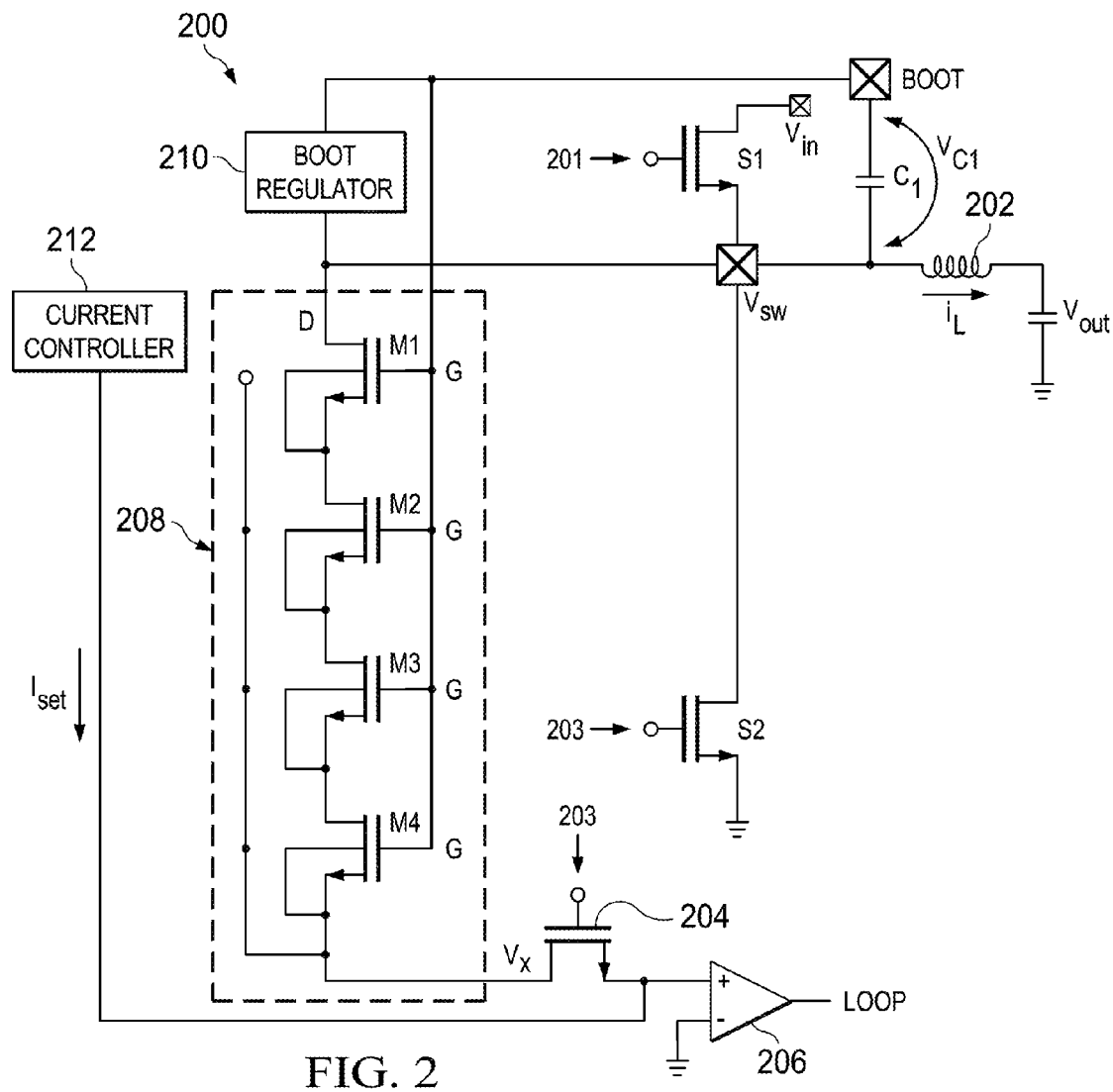
FIG. 2 shows a further illustration of a DC-to-DC buck converter comprising a current sense controller in accordance with various embodiments.

FIG. 2 shows an exemplary block diagram of a DC-to-DC buck converter 200 to illustrate the disclosed current sense controller in accordance with various embodiments. The converter 200 includes a first switch S1, a second switch S2, an inductor 202, a current sense controller 208, a boot regulator 210, a comparator 206, and a current controller 212. Further, the switch S1 is connected to an input voltage $V_{in}$ and a common node, $V_{sw}$, and the switch S2 is connected to the common node $V_{sw}$ and ground. In an example, a drain and a source terminals of the switch S1 are connected to the input voltage $V_{in}$ and the common node $V_{sw}$ respectively, and a drain and a source terminals of the switch S2 are connected to the common node $V_{sw}$ and ground respectively.

The inductor 202 is connected to the common node $V_{sw}$ and an output voltage node $V_{an}$. A capacitor, C1, is connected to the common node $V_{sw}$ and a boot voltage node BOOT. Preferably, the converter 200 further includes a transistor 204 connected between a first input of the comparator 206 and the current sense controller 208. A node between the current sense controller 208 and the transistor 204 is referred to as, $V_x$, as shown in FIG. 2.

The capacitor C1 is configured to maintain a constant voltage drop, $V_{c1}$, between the BOOT node and the common node $V_{sw}$. As such, a voltage level at the BOOT node may vary in accordance with a voltage level at the common node $V_{sw}$. For ease of reference, the voltage levels at the common node, the BOOT node, the node between the current sense controller 208 and the transistor 204, and the output voltage node are referred to as $V_{sw}$, $V_{BOOT}$, $V_x$ and $V_o$.

More specifically, as shown in FIG. 2, the boot regulator 210 connects the BOOT node to a drain ("D") terminal node of the current sense controller 208 and is configured to regulate a voltage level to operate the current sense controller 208 in accordance with a voltage level of the gate ("G") terminal nodes of the current sense controller 208. In a preferred example as illustrated in FIG. 2, the current sense controller 208 comprises four power metal oxide semiconductor field effect transistors (power MOSFETs), M1, M2, M3 and M4, connected in series. The power MOSFETs, M1-M4, are preferably n-type laterally diffused metal oxide semiconductor (LDMOS) transistors in order to sustain a high voltage drop across each of the transistors and provide a high power output. Further, the gate terminal nodes (i.e., "G" terminal nodes shown in FIG. 2) of the transistors (M1-M4) are tied together and connected to the BOOT node.

The current controller 212 is connected to the first input of the comparator 206. Preferably, the current controller 212 functions as a current source and is configured to provide a constant current $I_{set}$. In a preferred embodiment, the current controller 212 may include a current source, and at least a current mirror coupled to the current source. The current mirror is configured to duplicate or amplify current provided by the current source so as to provide the constant current $I_{set}$. More specifically, a switch may be coupled to the current mirror to further switch the current $I_{set}$ on and off.

Still referring to FIG. 2, the switches S1 and S2 are configured to switch on and off alternately so as to couple the input voltage $V_{in}$ and ground to the output voltage node $V_{out}$ respectively. The switches preferably are not both on at the same time. As such, the switch S1 is generally referred to as a high-side switch, and the switch S2 is referred to as a low-side switch, wherein the switches S1 and S2 are controlled by control signals 201 and 203 respectively. Each of the control signals 201 and 203 is preferably a pulse width modulated signal such as a square wave having a particular duty cycle. As a result, the voltage level at the common node (i.e., $V_{sw}$) may vary as a square wave. Moreover, since $V_{BOOT}$ (the voltage on the BOOT node) equals the constant voltage drop $V_{c1}$ plus the voltage level at the common node $V_{sw}$, that is $V_{BOOT}=V_{sw} V_{c1}$, $V_{BOOT}$ may be a square wave as well. Waveforms of the control signal 203, $V_{BOOT}$, and $V_{sw}$ will be provided with respect to FIG. 3 to further explain a preferred embodiment to avoid a high voltage drop across the current sense controller 208.

Figure 3:
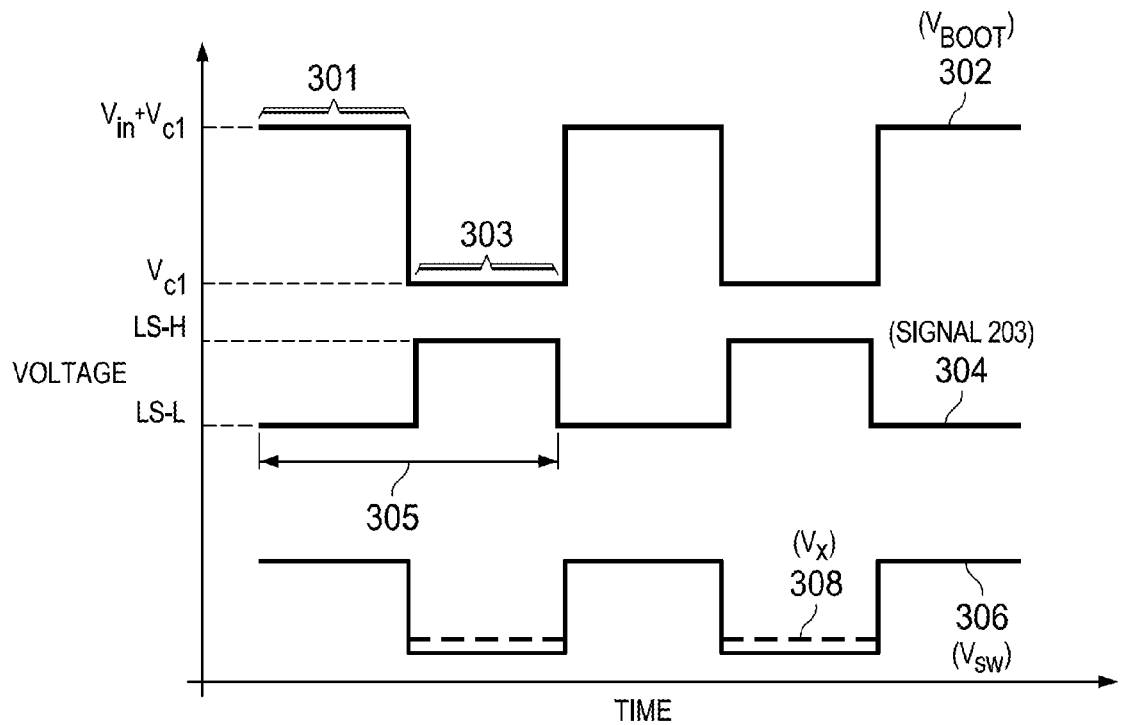
FIG. 3 shows an example of waveforms for multiple nodes and a signal of a DC-to-DC buck converter in accordance with various embodiments.

FIG. 3 shows an example to illustrate waveforms for the various nodes $V_{sw}$, $V_{BOOT}$, and $V_x$, as well as control signal 203 of the converter 200 in accordance with various embodiments. Waveforms 302, 304, 306, and 308 respectively correspond to the voltage levels for $V_{BOOT}$, control signal 203, $V_{sw}$, and $V_x$.

In a preferred embodiment, the low-side switch S2 is switched ON and OFF alternately via the control signal 203, wherein the control signal 203 has a square wave characteristic with a corresponding duty cycle. A duty cycle is a percentage of a period in which a signal is active (i.e., a higher state). As such, the waveform 304 shows a transition from a lower state (i.e., LS-L) to a higher state (i.e., LS-H) within a period 305. When the next period starts, the waveform 304 transitions to the lower state, LS-L, again. Each period 305 comprises two time portions (e.g., 301 and 303). Preferably, during the time portion 301 when the control signal 203 (waveform 304) is at the lower state, the low-side switch S2 of the converter 200 is turned OFF and simultaneously the high-side switch S1 is turned ON. Analogously, during the time portion 303, the low-side switch S2 is turned ON and the high-side switch S1 is turned OFF.

Referring to the waveform 302 in FIG. 3, while the high-side switch S1 is on, the input voltage $V_{in}$ is coupled to the output voltage node $V_{out}$, which causes $V_{sw}$ to equal $V_{in}$. As described above, $V_{c1}$ is a constant voltage drop across the capacitor C1. Thus, during this time portion (i.e., 301), $V_{BOOT}$ equals $V_{in}+V_{c1}$. Moreover, the high-side switch S1 is off and the low-side switch S2 is on during the consecutive time portion 303, which means that ground (i.e., a zero voltage level) is coupled to the output voltage node $V_{out}$ via the low-side switch S2. As a result, $V_{BOOT}$ equals $V_{c1}$ as shown in the waveform 302.

In another preferred embodiment, the current sense controller 208 remains on during the switching cycle. In other words, during the time portions 301 and 303, each of the transistors (i.e., M1-M4) is on, and, in turn, Vsw and Vx vary in a similar fashion as shown in the waveforms 306 and 308 of FIG. 3. Due to a voltage drop caused by a conductive resistance of each transistor M1-M4, there is only a small difference of a voltage level during the time portion 303 (i.e., the low-side switch S2 is on). Although each of the transistors of the current sense controller 208 is always kept conductive (i.e., on), the current sense controller 208 is preferably configured to sense the inductor current $i_L$ while the low-side switch S2 is on.

Details of the inductor current sensing while the low-side switch S2 is on are given below. Referring back to the converter 200 in FIG. 2, a switching behavior (on and off) of the transistor 204 is also controlled by the signal 203 (waveform 304). The comparator 206 preferably is to be a virtual ground amplifier (VGA). As shown in FIG. 2, one of the inputs of comparator 206 is connected to ground (i.e., a zero ground voltage level), which means that while the transistor 204 is on, the VGA causes the voltage level $V_x$ to equal zero, or approximately equal zero because of a small conductive resistance of the transistor 204. If $V_x=0$, the inductor current can be given as $$\frac{R_{sen}}{R_{LSF}} I_{set},$$

wherein $R_{sen}$ is an equivalent conductive resistance for the serially connected transistors M1-M4 and $R_{LSF}$ represents a conductive resistance for the low-side switch S2. As shown in the $i_L$ equation given above, the inductor current can be determined, by the converter, based on the conductive resistances ($R_{sen}$ and $R_{LSF}$). Moreover, as a result of ever advanced semiconductor technologies, the conductive resistance of a semiconductor device (e.g., the switches S1, S2, transistors M1-M4) can be accurately controlled. Thus, based on the equation of the inductor current, the inductor current may be accurately sensed as well.

In a conventional converter, there exists a high voltage drop across the current sense controller 208 while the high-side switch S1 is on. More specifically, the high voltage drop is associated with the input voltage $V_{in}$ and preferably the high voltage drop is across the "D" terminal node and the $V_x$ terminal node. This high voltage drop may cause a parasitic bipolar effect at the transistors M1-M4, which in turn may cause a malfunction of the current sense controller 208.

In contrast, the disclosed embodiment avoids this high voltage drop occurred while the high-side switch S1 is on by controlling $V_x$ to vary with the voltage level at the D terminal node. Since the D terminal node is connected to the common node $V_{sw}$ and the current sense controller 208 is always on, $V_x$ (waveform 308) may change in accordance with $V_{sw}$ (waveform 306) so as to avoid the high input voltage (e.g., $V_{in}$) being occurred across the current sense controller 208.

Figure 4:
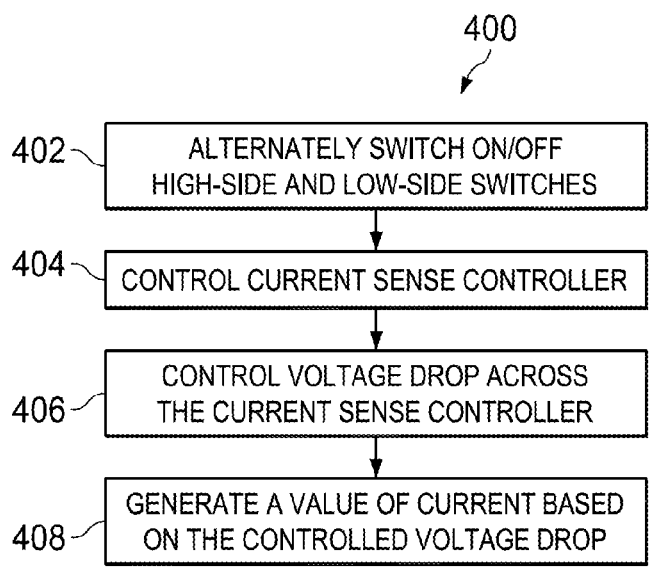
FIG. 4 shows a flow chart to illustrate a method to accurately sense inductor current of a DC-to-DC buck converter in accordance with various embodiments.

FIG. 4 shows a flow chart 400 illustrating a method to sense the inductor current $i_L$ in the converter 200 in accordance with various embodiments. The flow chart 400 begins at block 402 alternately switching, by the converter 200, on and off of the high-side and low-side switches S1 and S2. The high-side and low-side switches are controlled by the signals 201 and 203 respectively, wherein each of the signals 201 and 203 is a PWM signal. Moreover, the PWM signal includes a square wave. While the high-side switch S1 is on, the input voltage $V_{in}$ is being coupled to the output voltage node $V_{out}$, and while the low-side switch S2 is on, ground is being coupled to the output voltage node $V_{out}$. As such, $V_{sw}$ may be a square wave as shown in the waveform 306. The square wave of the waveform 306 includes a higher and a lower states, which are $V_{in}$ and ground (i.e., zero) respectively.

The flow chart 400 continues with block 404 controlling the current sense controller 208, based on the voltage level $V_{BOOT}$ so as to keep the current sense controller 208 always on during the switching behavior of the high-side and low-side switches S1 and S2. Referring back to FIG. 3, the waveform 302 representing $V_{BOOT}$ is a square wave, including the higher state equivalent to $V_{sw}+V_{c1}$ (i.e., $V_{in}+V_{c1}$) and the lower state equivalent to $V_{c1}$ (because $V_{sw}$ equals zero while the low-side switch S2 is on). Preferably, the current sense controller 208 comprises four power transistors connected in series, and the gate of each power transistor is connected to the BOOT node. In other words, an operation point (on or off) of the power transistor may be partially determined by the voltage level at the BOOT node (i.e., $V_{BOOT}$). The power transistor of the current sense controller 208 may be a LDMOS transistor.

Although the current sense controller 208 remains on during the switching on and off of the switches S1 and S2, the current sense controller 208 is only configured to sense the inductor current while the low-side switch S2 is on. Meanwhile, during the time period in which the high-side switch S1 is on, the converter 200 avoids the high voltage drop across the transistors M1~M4 by varying the voltage levels $V_x$ and $V_{sw}$ accordingly.

While the low-side switch S2 is on, the flow chart 400 continues with block 406 controlling, based on the conductive resistance $R_{sw}$ of the power transistors M1~M4 of the current sense controller 208, a voltage drop across the current sense controller 208.

After the voltage drop has been determined, the flow chart 400 routes to block 408 generating a value of the inductor current $i_L$ based on the voltage drop. More specifically, the inductor current $i_L$ is further determined by the conductive resistance $R_{LSF}$ of the low-side switch S2. In accordance with various embodiments, the inductor current may be given as, $$\frac{R_{sen}}{R_{LSF}} I_{set}.$$

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC-to-DC converter, comprising:
a high side switch connected to an input voltage and a common node and , if on, the high side switch provides a signal path through the high side switch and through the common node to an output voltage node of the DC-to-DC converter;
a low side switch connected to ground and the common node and, if on, the low side switch provides a signal path through the low side switch and through the common node to the output voltage node of the DC-to-DC converter; and
a plurality of power transistors, coupled to the common node, the power transistors to control a first current flowing through an inductor connecting the common node to the output voltage node based on a second current provided by a current source and a value of a conductive resistance of the plurality of power transistors, wherein the first current determines an output voltage at the output voltage node of the DC-to-DC converter;
wherein each of the plurality of the power transistors is configured to be on both when the high side switch is on and when the low side switch is on, and each of the plurality of the power transistors is controlled by the high side switch and the low side switch concurrently so as to prevent a high voltage drop from overstressing the plurality of the power transistors while the high side switch is on.

2. The DC-to-DC converter of claim 1 wherein the high side switch and the low side switch are respectively controlled by a high side pulse width modulated signal and a low side pulse width modulated signal so as to cause the high side switch and the low side switch to be turned on alternately.

3. The DC-to-DC converter of claim 1 further comprising a virtual ground amplifier (VGA) and a VGA power transistor coupled to a first input of the virtual ground amplifier, wherein the VGA power transistor is configured to block a high voltage drop from reaching the first input of the virtual ground amplifier while the high side switch is on.

4. The DC-to-DC converter of claim 3 wherein the VGA power transistor is to be controlled by the low side pulse width modulated signal.

5. The DC-to-DC converter of claim 1 wherein the plurality of transistors include isolated laterally diffused metal oxide semiconductor (LDMOS) transistors.

6. The DC-to-DC converter of claim 1 wherein the plurality of power transistors controls the first current while the low side switch is on.

7. The DC-to-DC converter of claim 1 wherein the power transistor's characteristic includes a value of the power transistor's conductance resistance.

8. A DC-to-DC converter, comprising:
a first switch to couple an input voltage to a common node;
a second switch coupled to the first switch, the first and second switches to be turned on and off in a reciprocating manner so as to couple either the input voltage or ground to the common node;
an inductor connecting the common node to an output voltage node of the DC-to-DC converter, to control a voltage at the output voltage node based on current flowing through the inductor; and
a plurality of serially connected power transistors concurrently controlled by a first signal that is based on a value of a voltage at the common node and a supply voltage, the serially connected power transistors to control an amount of current flowing through the inductor;
wherein the first signal is used to prevent a high voltage drop from overstressing the plurality of power transistors while the first switch is on; and
wherein each gate of the plurality of serially connected power transistors is controlled by a boot voltage such that each of the plurality of serially connected power transistors is configured to be on while the first switch is on and while the second switch is on.

9. The DC-to-DC converter of claim 8 wherein the first and the second switches are controlled by first and second pulse width modulated signals respectively.

10. The DC-to-DC converter of claim 8 wherein the amount of current flowing through the inductor is determined by conductance resistances of each of the plurality of power transistors and the second switch, and a current source coupled to the plurality of power transistors.

11. The DC-to-DC converter of claim 8 wherein the first signal used to control the plurality of power transistors includes a square wave transitioning between a low voltage and a high voltage, wherein a value of the high voltage is based on the voltage supply and a voltage drop across a capacitor connecting between the voltage supply and the common node and a value of the low voltage is the voltage drop across the capacitor.

12. The DC-to-DC converter of claim 8 wherein the plurality of transistors include isolated laterally diffused metal oxide semiconductor (LDMOS) transistors.

13. The DC-to-DC converter of claim 8 further comprising a virtual ground amplifier and an additional power transistor connecting one of the plurality of the power transistors to an input of the virtual ground amplifier, wherein the additional power transistor is configured to block a high voltage drop from the input of the virtual ground amplifier.

14. A method, comprising:
alternately switching on a high side switch and a low side switch of a DC-to-DC converter;
controlling a plurality of power transistors coupled to the low side switch, based on a signal that includes a value of a constant voltage plus a value of a voltage at a common node connecting to the high side and low side switches, each of the plurality of power transistors configured to be on while the high side switch is on and while the low side switch is on;
controlling, by the plurality of the power transistors, a voltage drop across the plurality of the power transistors, based on a value of conductance resistance of the plurality of the power transistors; and
generating, based on the controlled voltage drop, a value of current flowing through an inductor connecting the common node and an output voltage node of the DC-to-DC converter.

15. The method of claim 14 wherein the value of the constant voltage includes a value of a voltage drop across a capacitor that connects to the common node and a voltage supply.

16. The method of claim 14 wherein the alternately switching is based on first and second pulse width modulated (PWM) signals, each of the first and second PWM signals includes a square wave.

17. The method of claim 16 wherein the square wave of the second pulse (PWM) signal includes a value of a higher voltage nearly equivalent to the value of the voltage drop across the capacitor.

* * * * *